United States Patent [19]
Fischer et al.

[11] Patent Number: 5,845,139
[45] Date of Patent: Dec. 1, 1998

[54] SYSTEM FOR PROVIDING A HOST COMPUTER WITH ACCESS TO A MEMORY ON A PCMCIA CARD IN A POWER DOWN MODE

[75] Inventors: Matthew J. Fischer, Mountain View; Charlie Sang, Fremont, both of Calif.

[73] Assignee: Advanced Micro Devices, Inc., Sunnyvale, Calif.

[21] Appl. No.: 487,316

[22] Filed: Jun. 7, 1995

[51] Int. Cl.$^6$ ........................................ G06F 1/32
[52] U.S. Cl. ........................ 395/750.06; 395/750.03; 395/750.04; 395/750.05; 711/115; 364/707; 365/227
[58] Field of Search ........................ 395/750, 226, 395/227, 750.03, 750.04, 750.05, 750.06; 327/544; 364/707; 711/115; 365/227

[56] References Cited

U.S. PATENT DOCUMENTS

| | | | |
|---|---|---|---|
| 4,385,369 | 5/1983 | Sheppard | 365/227 |
| 5,361,364 | 11/1994 | Nagashige et al. | 395/750.01 |
| 5,404,543 | 4/1995 | Faucher et al. | 395/750.05 |
| 5,465,367 | 11/1995 | Reddy et al. | 365/222 |
| 5,475,847 | 12/1995 | Ikeda | 395/750.04 |
| 5,546,590 | 8/1996 | Pierce | 395/750.05 |
| 5,584,031 | 12/1996 | Burch et al. | 395/750.05 |
| 5,586,332 | 12/1996 | Jain et al. | 395/750.04 |
| 5,652,895 | 7/1997 | Poisner | 395/750.04 |
| 5,721,935 | 2/1998 | DeSchepper et al. | 364/707 |

FOREIGN PATENT DOCUMENTS

| | | |
|---|---|---|
| 621526 A1 | 4/1994 | European Pat. Off. . |
| 6282362 | 10/1994 | Japan . |
| 7084686 | 3/1995 | Japan . |
| WO92/09028 | 5/1992 | WIPO . |

OTHER PUBLICATIONS

"IBM Technical Disclosure Bulletin", Mar. 1995, vol. 38, pp. 593–596.

Primary Examiner—Eddie P. Chan
Assistant Examiner—Hong C. Kim

[57] ABSTRACT

A wake-up system is provided to allow host computer access to a Card Information Structure (CIS) on a PCMCIA card during a SLEEP mode. The CIS is stored in a non-volatile memory accessible to a host computer via a PCMCIA bus and to PCMCIA card logic via a local bus. Arbitration logic is coupled between the PCMCIA and local buses to control access to the memory. Sleep logic prevents a fast clock signal from being supplied to the arbitration logic and the PCMCIA card logic when the PCMCIA card is switched into the SLEEP mode. A CIS read detect circuit decodes a CIS read operation on the PCMCIA bus and asserts the CIS detect signal supplied to the sleep logic. In response, the sleep logic allows the fast clock signals to be supplied to the arbitration logic and adapter card subsystem to exit from the SLEEP mode and provide the host computer with access to the memory storing the CIS information.

16 Claims, 1 Drawing Sheet

SYSTEM FOR PROVIDING A HOST COMPUTER WITH ACCESS TO A MEMORY ON A PCMCIA CARD IN A POWER DOWN MODE

TECHNICAL FIELD

The present invention relates generally to portable computers, and more particularly, to a system that causes a PCMCIA card to exit from a power down mode to convey its configuration information to a host.

BACKGROUND ART

For expansion of laptop, notebook and sub-laptop personal computers, the Personal Computer Memory Card Industry Association (PCMCIA) bus standard defines interface specifications for expansion cards. The standard not only defines card dimensions and a bus pin-out, but also describes file formats and data structures, a means that allows a card to convey its configuration and capabilities to a host, and a device-independent means of accessing card hardware and software links.

In particular, the PCMCIA bus standard specifies that information on resource requirements for a card should reside in a non-volatile memory on the card. Resources that may be required by the card include, for example, interrupt channel numbers, DMA channel numbers, and amount of memory space required from the host computer system.

To offer several options for configuration, the card includes various combinations of the resource requirements. This information is to be read by configuration software that resides in the host computer system at the time of insertion of the card into the host computer, or at the time the computer is turned on. The information residing in the non-volatile memory on the card for purposes of PCMCIA bus configuration is called card Information Structure (CIS).

The PCMCIA bus standard requires the CIS to be permanently available for reading through a PCMCIA bus coupled the host computer to the card, including the time periods when the card is put into a power-down mode. This mode, defined by the PCMCIA bus standard, is a SLEEP mode intended to reduce the current consumed by the card, in order to preserve precious battery power of a portable computer. A status bit is sent from the card to the host computer to indicate whether or not the card is in the SLEEP mode.

A common method for storing the CIS information is to place it within a non-volatile memory device of a PCMCIA adapter card inserted into a host portable computer. For example, a flash memory may be used for storing the CIS. This flash memory may be accessible by the host computer through the PCMCIA bus, and by a subsystem that resides on the adapter card through a bus local to the adapter card. The adapter card sub-system is controlled by a clock. When the adaptor card is in the SLEEP mode, it is desired that the clock to the adapter card sub-system be disabled in order to conserve as much power as possible. However, when assesses by the adapter card subsystem to the flash memory are synchronous and arbitrations between host computer access and subsystem access are also synchronous, access from the host computer to the CIS memory is prohibited if the subsystem clock is disabled. To provide permanent host computer access to the CIS non-volatile memory, an interface circuit of the adapter card's subsystem continues to receive the clock even when the card is in the SLEEP mode. This allows host computer access to the CIS during the SLEEP mode, but results in increased current consumption.

Another approach is to provide a secondary storage of the CIS in a second non-volatile memory device accessible to the host computer during the SLEEP mode. However, in this case, host computer access is provided through a random logic interface that never goes into the SLEEP mode. Also, a logic circuit associated with the second memory device is required to transfer the CIS from the CIS memory to the PCMCIA data bus. Accordingly, this approach will result in additional interface logic and an additional non-volatile memory device, as well as in increased power consumption.

Therefore, it would be desirable to provide the host computer access to the CIS during the SLEEP mode with reduced power consumption of battery-powered portable computers.

DISCLOSURE OF THE INVENTION

Accordingly, one advantage of the invention is in providing a system that allows host computer access to a CIS memory on a PCMCIA card during a SLEEP mode, without additional non-volatile memory and interface logic.

Another advantage of the invention is in providing a wake-up system for activating a PCMCIA card during a SLEEP mode that allows power consumption of battery-powered portable computers to be reduced.

The above and other advantages of the invention are achieved, at least in part, by providing a system for switching a PCMCIA card from a SLEEP mode to allow a host computer to access a CIS via a PCMCIA bus. A non-volatile memory accessible to the host computer and the PCMCIA card logic is provided on the PCMCIA card for storing the CIS and other information. Arbitration logic is coupled to the memory to control the host computer's and PCMCIA card logic access to the memory. Sleep logic supplies a sleep control signal to switch the arbitration logic and the PCMCIA card into the SLEEP mode. A CIS read detect logic monitors the PCMCIA bus to supply the sleep logic with a CIS read detect signal when a CIS read operation is detected. The CIS read detect signal activates the arbitration logic to allow the host computer to access the CIS.

In accordance with one aspect of the invention, the sleep control signal prevents a fast clock signal from being supplied to the arbitration logic and to the PCMCIA card logic. In response to the CIS read detect signal, the sleep logic allows the fast clock signal to be supplied to the arbitration logic. Also, the fast clock signal may be allowed to be supplied to the remaining logic on the PCMCIA card.

In accordance with another aspect of the invention, a slow clock signal at a frequency lower than the fast clock signal is supplied to the sleep logic during the SLEEP mode to activate the PCMCIA card after a preprogrammed time interval.

In accordance with a method of the present invention, the following steps are carried out:

storing the CIS information in a non-volatile memory accessible to the host computer via a PCMCIA bus and to as adapter card logic via a local bus, controlling by an arbitration means accesses of the PCMCIA bus and the local bus to the non-volatile memory, disabling the arbitration means in response to a sleep control signal that switches the PCMCIA card into the SLEEP mode, monitoring the PCMCIA bus to decode a CIS read operation, and activating the arbitration means in response to the decoded CIS read operation to allow the host processor to access the non-volatile memory.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

Although the invention has general applicability in the field of interfacing a peripheral subsystem to a host system, the best mode for practicing the invention is based in part on the realization that an interface between a card and a host computer meets PCMCIA bus standard requirements.

Figure 1:
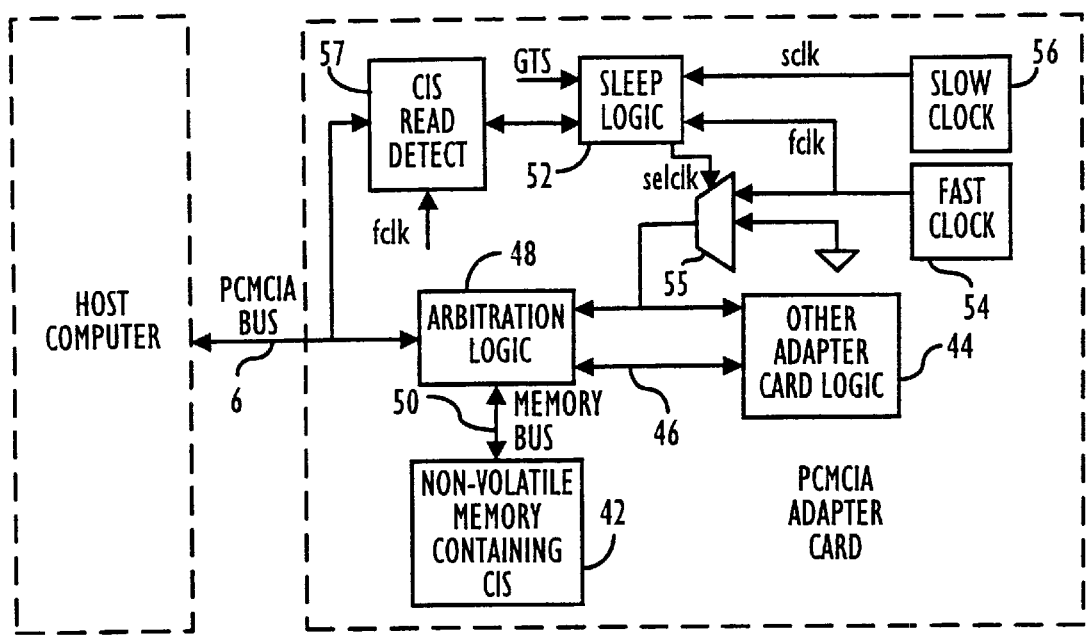
FIG. 1 is a block-diagram illustrating a wake-up system for PCMCIA cards in accordance with the present invention.

Referring to FIG. 1, a host computer 2 is coupled to a PCMCIA adapter card 4 through a PCMCIA bus 6. The card 4 comprises a non-volatile memory 42 containing CIS and other information used by logic on the card or in the host computer system. For example, a flash memory may be used for storing the CIS information. The flash memory 42 is accessible to a subsystem residing on the adapter card. This subsystem is represented by a block 44. The subsystem accesses the memory 42 through a local bus 46. As discussed above, the CIS information in memory 42 must be accessible to the host computer 2. Host computer access to the memory 42 is provided through the PCMCIA bus 6. Arbitration logic 48 arbitrates between host computer and subsystem accesses to the memory 42. The logic 48 is coupled to the memory 42 via a memory bus 50.

SLEEP logic 52 supports the SLEEP mode of the PCMCIA card 4. The SLEEP logic 52 may be implemented by a power down state machine activated by a GO TO SLEEP (GTS) signal asserted by the adapter card subsystem 44. Alternatively, the GTS signal may be provided by the host computer 2. In response to the GTS signal, the power down machine asserts a select clock (selclk) signal supplied to a multiplexer 55 having two inputs. One of these inputs is provided with a fast clock (fclk) signal from a fast clock 54. For example, a 40 MHz clock signal may be generated by the fast clock 54. Another input is grounded.

When the adapter card 4 is not in the SLEEP mode, the selclk signal is deasserted to allow the fclk signal to be supplied from the output of the multiplexer 55 to the arbitration logic 48 and the adapter card subsystem 44. However, when the card is placed into the SLEEP mode initiated by the GTS signal, the asserted selclk prevents the fclk signal from being supplied to the arbitration logic 48 and the adapter card subsystem 44. Instead, these circuits will be connected to ground. This will cause the arbitration logic 48 and the adapter card subsystem 44 to be switched into a low power state to preserve the computer's battery power. In this state, no logical functions occur in either the arbitration logic 48 or the adapter card subsystem 44. Accordingly, no access from the PCMCIA bus 6 to the memory 42 is provided.

The SLEEP logic 52 may be preprogrammed to exit the SLEEP mode after a predetermined time interval. Slow clock (sclk) signals, are supplied, for example at 32 KHz, from a slow clock 56 to the SLEEP logic 52 to define this time interval. For example, the exit from the SLEEP mode may be initiated when a counter in the logic 52 that counts when the sclk signals reaches a predetermined count.

To provide host computer access to the memory 42 during the SLEEP mode in accordance with PCMCIA bus standard requirements, a CIS read detect circuit 57 is incorporated onto the adapter card 4. The CIS read detect circuit 57 is active during the SLEEP mode to monitor the PCMCIA bus 6. When the CIS read operation initiated by the host computer 2 is detected on the PCMCIA bus 6, the CIS read detect circuit 57 asserts a CIS detect signal supplied to the SLEEP logic. In response, the SLEEP logic deasserts the selclk signal to allow the fclk signal to pass through the multiplexer 54. The fclk signal is supplied to the arbitration logic 48 and to the adapter card subsystem 44 to cause the SLEEP mode to be exited. Alternatively, the fclk signal may be supplied only to the arbitration logic 48 to allow the adapter card subsystem 44 to stay in the SLEEP mode. As a result, host computer access to the CIS memory 42 is provided in a short time period that allows the adapter card 4 to comply with PCMCIA bus protocol defined duration of bus cycle.

Figure 2:
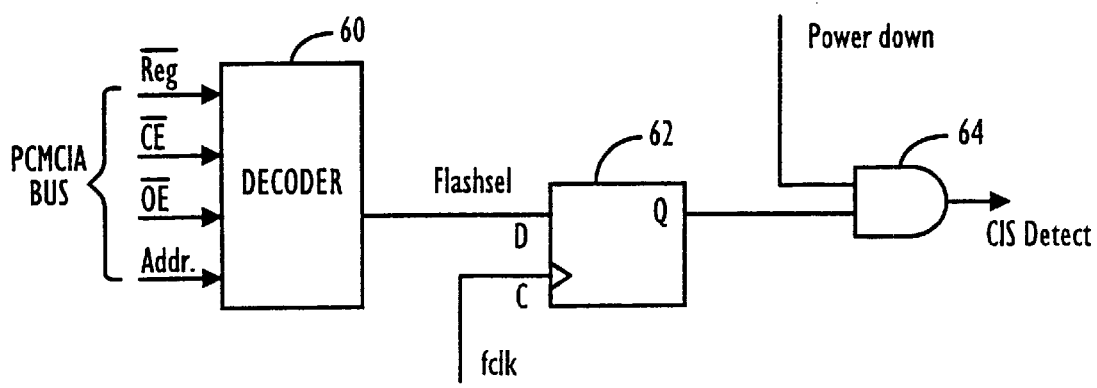
FIG. 2 is a diagram illustrating the CIS read detect circuit shown in FIG. 1.

Referring to FIG. 2, the CIS read detect circuit 57 comprises a PCMCIA decoder 60 coupled to the PCMCIA bus 6. The decoder 60 receives a register select (Reg) signal, a chip enabling (CE) signal, an output enabling (OE) signal and address (Addr) signals supplied through the PCMCIA bus 6 in accordance with the PCMCIA bus standard to detect a flash select (flashsel) signal indicating that the host computer 2 requests CIS information from the memory 42. Through a D flip-flop 62, the flashsel signal is supplied to an AND gate 64. The clock input of the D flip-flop 62 is supplied with the fclk signal. The AND gate 64 is also provided with a power down signal from the SLEEP logic asserted during the SLEEP mode. As a result, the AND gate 64 supplies the SLEEP logic 52 with the CIS detect signal, when the flashsel signal is detected during the SLEEP mode. As discussed above, the CIS detect signal causes the SLEEP mode to be exited to allow host computer access to the memory 42 to read the CIS information.

Following the completion of the CIS read operation, the adapter card subsystem 44 may again place the adapter card 4 into the SLEEP mode. Alternatively, the switching back to the SLEEP mode may be initiated by the host computer 2.

There accordingly has been described a wake-up system that allows host computer access to the CIS information during the SLEEP mode. A CIS read operation on the PCMCIA bus is detected by the CIS read detect circuit that asserts the CIS detect signal supplied to the SLEEP logic. In response, the SLEEP logic allows the fast clock signals to be supplied to the arbitration logic and adapter card subsystem to exit from the SLEEP mode and provide the host computer's access to the memory storing the CIS information.

Accordingly, the disclosed system allows the entire adapter card, except for the circuits involved in the CIS read detection, to enter the SLEEP mode, thereby minimizing the power consumption of battery-powered portable computers. Also, the system allows the additional non-volatile memory and additional PCMCIA interface logic required in some implementations to be removed. The removal of these devices yields cost savings due to reducing the component count required to build a system as well as due to reducing system complexity, thereby increasing reliability and reducing costs at the assembly and test stages of product manufacture. Moreover, the form factor for a standard PCMCIA card is strictly limited, and the removal of components from the card allows valuable card space to be used, for example, for providing additional features.

In this disclosure, there are shown and described only the preferred embodiments of the invention, but it is to be understood that the invention is capable of changes and modifications within the scope of the inventive concept as expressed herein.

We claim:

1. A system for providing a host computer with access to a memory on an adapter card in a power down mode of operation, comprising, on said adapter card:

an arbitration circuit for selectively allowing adapter card logic and said host computer to access said memory, in said power down mode, said arbitration circuit being switched into a low power state, in which said arbitration circuit performs no logical functions, a power down circuit responsive to a power down mode initiating signal for switching said adapter card logic and said arbitration circuit into said low power state, and a read detecting circuit responsive to a reading signal from said host computer for activating said power down circuit to switch said arbitration circuit from said low power state, thereby allowing said host computer to access said memory.

2. The system of claim 1, wherein said host computer is coupled to said adapter card through a PCMCIA bus.

3. The system of claim 1, wherein said memory comprises a non-volatile memory device for storing information on configuration and capabilities of said adapter card.

4. The system of claim 1, wherein said power down mode initiating signal is supplied by said adapter card logic.

5. The system of claim 1, wherein said power down mode initiating signal is supplied by said host computer.

6. The system of claim 1, wherein said power down circuit prevents a clock signal to be supplied to said arbitration circuit and said adapter card logic in said power down mode.

7. The system of claim 6, wherein said power down circuit allows said clock signal to be supplied to said arbitration circuit in response to said reading signal.

8. The system of claim 7, further comprising a fast clock for supplying said clock signal and a slow clock for supplying a slow clock signal at a frequency lower than that of said clock signal.

9. The system of claim 8, wherein said slow clock signal is supplied to said power down circuit.

10. The system of claim 9, wherein said power down circuit comprises a counter responsive to said slow clock signal for activating said adapter card in accordance with a preset program.

11. The system of claim 2, wherein said read detecting circuit comprises a decoder responsive to said PCMCIA bus for decoding said reading signal.

12. The system of claim 11, wherein said read detecting signal comprises a gate circuit responsive to said decoder and to a power down mode indicating signal from said power down circuit for supplying said power down circuit with an activating signal.

13. A system for switching a PCMCIA card from a SLEEP mode to allow a host computer to access a CIS of the PCMCIA card via a PCMCIA bus, comprising a non-volatile memory provided on said PCMCIA card for storing the CIS, arbitration logic coupled to said memory for providing said host computer and a PCMCIA card logic with access to said memory, a sleep logic coupled to said arbitration logic and said adapter card logic for supplying a sleep control signal to switch said arbitration logic and said PCMCIA logic card into a power saving mode, in which said arbitration logic performs no logical functions, and a CIS read detect logic coupled between said PCMCIA bus and said sleep logic for supplying said sleep logic with a CIS read detect signal when a CIS read operation is detected on said PCMCIA bus, said CIS read detect signal activating said arbitration logic to allow said host computer to access the CIS.

14. The system of claim 13, wherein said sleep control signal prevents a clock signal from being supplied to said arbitration logic and to said PCMCIA card logic.

15. The system of claim 14, wherein said sleep logic allows said clock signal to be supplied to said arbitration logic in response to said CIS read detect signal.

16. A method of providing a host computer with an access to CIS information on a PCMCIA card in a SLEEP mode, comprising the steps of:

storing the CIS information in a non-volatile memory accessible to the host computer via a PCMCIA bus and to an adapter card logic via a local bus, controlling by an arbitration means accesses of the PCMCIA bus and the local bus to the non-volatile memory, in response to a sleep control signal that switches the PCMCIA card into the SLEEP mode, disabling the arbitration means to prevent logical functions from being performed by the arbitration means, monitoring the PCMCIA bus to decode a CIS read operation, and activating the arbitration means in response to the decoded CIS read operation to allow the host processor to access the non-volatile memory.

* * * * *